(12) United States Patent
Kogure et al.

(10) Patent No.: US 6,984,003 B2
(45) Date of Patent: Jan. 10, 2006

(54) CORNERING POWER CONTROL DEVICE AND METHOD

(75) Inventors: Masaru Kogure, Tokyo (JP); Yutaka Hiwatashi, Tokyo (JP); Koji Matsuno, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/653,142

(22) Filed: Sep. 3, 2003

(65) Prior Publication Data

US 2004/0162663 A1    Aug. 19, 2004

(30) Foreign Application Priority Data

Sep. 4, 2002   (JP) .............................. 2002-259365
Aug. 5, 2003   (JP) .............................. 2003-205929

(51) Int. Cl.
*B60T 8/60*   (2006.01)
*B60T 8/24*   (2006.01)

(52) U.S. Cl. ........................................ 303/146; 701/72
(58) Field of Classification Search ................. 303/146, 303/148; 701/41, 72, 74, 75
See application file for complete search history.

(56) References Cited

U.S. PATENT DOCUMENTS 5,899,952 A  *  5/1999   Fukada ....................... 303/146

FOREIGN PATENT DOCUMENTS

JP         10281944 A   *  10/1998
JP          3132190        11/2000
JP       2003118612 A   *   4/2003

* cited by examiner

*Primary Examiner*—Thomas Williams
(74) *Attorney, Agent, or Firm*—McGinn IP Law, PLLC (57) ABSTRACT

To provide a new vehicle control technique, a calculation section calculates a cornering power ka using the detected longitudinal force Fx, lateral force Fy, and vertical force Fz, and the identified friction coefficient $\mu$. This calculation is made based on the correlation between a slip angle $\beta$ of the wheels and the lateral force Fy. Based on thus calculated cornering power ka and a target cornering power ka' required for the wheels, a processing section determines a change amount for changing at least one action force out of the longitudinal force Fx, the lateral force Fy, and the vertical force Fz, all acting on the wheels. Based on thus determined change amount, a control section controls at least one action force out of the longitudinal force Fx, the lateral force Fy, and the vertical force Fz, all acting on the wheels.

20 Claims, 5 Drawing Sheets

CORNERING POWER CONTROL DEVICE AND METHOD

BACKGROUND OF THE INVENTION

1. Field of the Invention

The present invention relates to a cornering power control device and a method for controlling a cornering power of a wheel and, more specifically, to vehicle control under which the kinetic state of a vehicle is controlled through control over the cornering power.

2. Description of the Related Art

A vehicle control technology has been conventionally known for controlling the kinetic state of a vehicle. Exemplarily applied thereto is a technique of controlling a driving/braking torque to be exerted on wheels, or controlling the suspension property of the wheels. With the vehicle control technology, exemplarily in such a driving condition as cornering, the steerbility and stability are improved through optimal control applied to the kinetic state of the vehicle. Such a technology includes a vehicle control device for controlling the kinetic state of the vehicle by using a wheel friction force utilization ration(refer to Japanese Patent No. 3132190 as an example). In this vehicle control device, the wheel friction force utilization ration is derived for each of the wheels, and a wheel state amount of the respective wheels is so controlled that the resulting wheel friction force utilization ratio is brought closer to a target wheel friction force utilization ratio. At this time, the wheel friction force utilization ration is calculated as a ratio of an actual friction force to the maximum friction force. Here, the actual friction force is a resultant force of the longitudinal force and the lateral force actually being generated between the wheels and the road surface. The maximum friction force is the product of the actual friction coefficient between the wheels and the road surface and the vertical force actually being generated between the wheels and the road surface.

To effectively control the kinetic state of the vehicle in a driving condition under which such vehicle control works more effectively, e.g., cornering driving or driving on low-$\mu$ roads, inventors, et al. of the present invention consider it preferable to pay attention on the cornering power. The reason is that, in driving stability analysis or vehicle dynamics control using a two-degree-of-freedom vehicle dynamics model (a model having considered translational motion in the lateral direction and rotary motion around a vertical axis), the cornering power is generally used for formulation such as static margin, or stability factor. Moreover, as to the cornering power, the responsivity of the (behavior change) cornering force is depending on the value size thereof. That is, the cornering power is considered as being an important factor for evaluating the steerbility and stability of the vehicle. As an example, in the above conventional technology, the kinetic state of the vehicle is improved by bringing the wheel friction force utilization ratio closer to the target wheel friction force utilization ratio. The problem is that, even if the wheel friction force utilization ratio is brought closer to the target wheel friction force utilization ratio, in view of the cornering power, the cornering power at this time may not be appropriate in value for the wheels. For example, if the cornering power is considerably smaller than the cornering power required for the wheels, there is a possibility that the vehicle controllability will be lost.

SUMMARY OF THE INVENTION

The present invention is proposed in view of such circumstances, and an object thereof is to provide a new vehicle control technique.

Another object of the present invention is to improve the steerbility and stability of the vehicle in driving condition such as cornering through control over the cornering power.

In order to solve such problems, a first invention provides a cornering power control device for controlling a wheel control power, including a detection section, an identification section, a calculation section, a processing section, and a control section. In the cornering power control device, the detection section detects a longitudinal force, a lateral force, and a vertical force each as an action force exerted on a wheel. The identification section identifies a friction coefficient between the wheel and a road surface. The calculation section calculates, using the detected longitudinal force, lateral force, and vertical force, and the identified friction coefficient, the cornering power based on a correlation between a slip angle and the lateral force of the wheel. The processing section determines, based on the calculated cornering power and a target cornering power required for the wheel, a change amount for changing at least one of the action forces including the longitudinal force, the lateral force, and the vertical force all acting on the wheel. The control section controls, based on the change amount determined by the processing section, at least one of the action forces including the longitudinal force, the lateral force, and the vertical force each acting on the wheel.

DESCRIPTION OF PREFERRED EMBODIMENT

Figure 1:
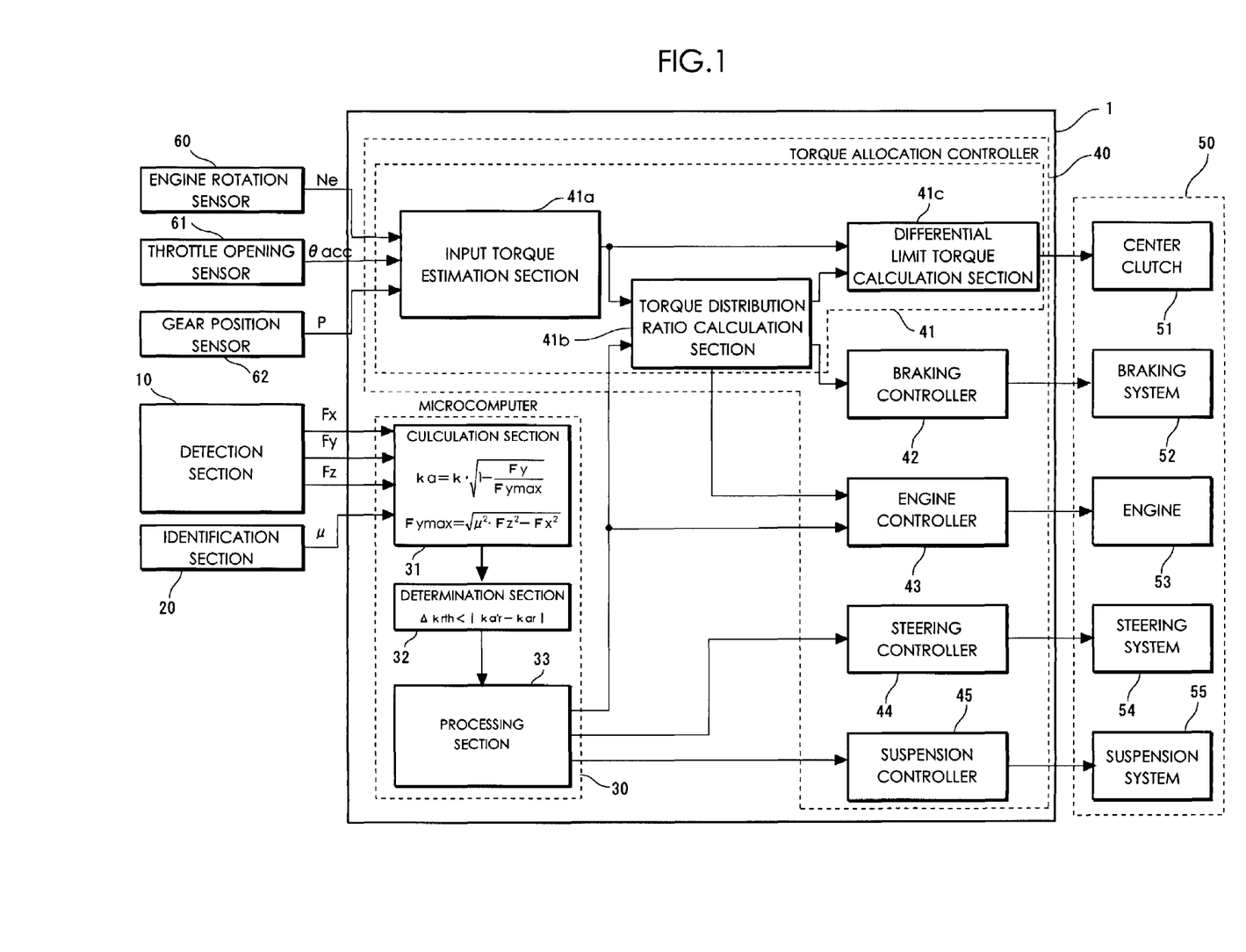
FIG. 1 is a block diagram showing the entire structure of a vehicle control system using a cornering power control device according to the present embodiment.

FIG. 1 is a block diagram showing the entire structure of a cornering power control device of the present embodiment. This cornering power control device 1 is applied to a vehicle having a plurality of wheels (exemplarily shown in the present embodiment is a four-wheel-drive vehicle) to control the kinetic state thereof. The control device 1 calculates a cornering power Ka for the wheels, i.e., each of the four wheels in this embodiment. This calculation is made based on a longitudinal force Fx, a lateral force Fy, and a vertical force Fz, each of which is exerted on the wheel, and a friction coefficient $\mu$ between the wheel and the road surface. Using a current value Ka of the cornering power and a target cornering power Ka' as determination factors, the control device 1 changes the action forces exerted on the wheel. The kinetic state of the vehicle is controlled in such a manner that the current cornering power ka is brought closer to the target cornering power Ka' through such a change of the action forces. In the below description, unless otherwise specified, the description focuses on one of wheels mainly to explain this embodiment. However, the description is considered applicable also to other wheels of the same vehicle.

Figure 2:
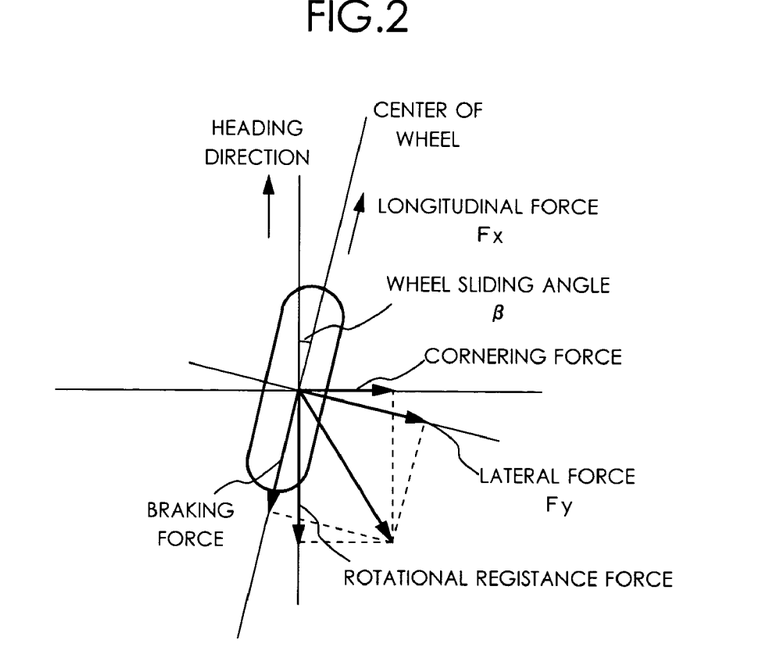
FIG. 2 is an illustrative diagram showing action forces acting on wheels.

FIG. 2 is an illustrative diagram showing the action forces acting on the wheel. In the drawing, exemplarily shown is a state in which the wheel brakes the vehicle in the heading direction. Herein, the cornering power ka, which is one of the characteristics of the present embodiment, denotes a slope of a cornering force with respect to a wheel slip angle β. Here, the cornering force is a component working in a direction at right angles to the heading direction of the wheel as a part of the friction acting on a wheel grounding surface. In other words, the cornering power ka is the rate of change of the cornering force with respect to the slip angle β. Thus, the larger the rate of change, the faster the responsivity of the (behavior change) cornering force. On the other hand, the smaller the rate of change, the slower the responsivity of the cornering force. The longitudinal force Fx denotes a split force developing in the direction parallel to the center plane of the wheel. The lateral force Fy denotes a split force developing in the right direction to the center plane of the wheel. The vertical force Fz denotes a load on the wheel in the vertical direction. The target cornering power Ka' denotes a cornering power required for the wheel, the value of which is set on a vehicle basis in consideration of the vehicle stability during the vehicle designing phase.

Described below is the cornering power control according to the present embodiment. First of all, the cornering power control is cleared what is the concept thereof, and then the specific structure of the cornering power control device 1 is described. Generally, the cornering power ka is calculated based on the correlation between the slip angle β of the wheel and the cornering force. The cornering force and the lateral force Fy in the present embodiment are not in a one-to-one relationship in value. Practically, these values tend to approximate each other in the range of the slip angle possibly taken by the wheel. Thus, in the present specification, the cornering force is considered equivalent in value to the lateral force Fy, and the cornering power is described based on the lateral force Fy. First, required to calculate the cornering power is the correlation between the slip angle β of the wheel and the lateral force Fy, satisfying the following equation 1, for example.

$$Fy = k \cdot \beta - \frac{k^2}{4 \cdot Fy\max} \cdot \beta^2 \qquad \text{[Equation 1]}$$

The correlation shown in the equation 1 is the one derived by subjecting quadratic approximation to the tire model showing the mechanical property of the tire using the slip angle β and the lateral force Fy, for example. The lateral Fy is expressed as quadric of the slip angle β.

Here, a coefficient k is a constant empirically derived by the following equation 2, and the value thereof changes depending on the friction coefficient $\mu$ between the wheel and the road surface, and the vertical force Fz.

$$k = \frac{dFy}{d\beta}\bigg|_{\beta=0} \qquad \text{[Equation 2]}$$

As is understood from the equation 2, the coefficient k is the rising gradient (differential value) of the lateral force Fy with the slip angle β=0. As described above, because of Lateral Force Fy≈Cornering Force, the value of the coefficient k can be also the rising gradient (differential value) of the cornering force with the slip angle β=0. Accordingly, the value of the coefficient k corresponds to the cornering power, and in the present specification, the coefficient k is called as reference cornering power k. This reference cornering power k is a value showing the wheel property, and the higher the value, the higher the rigidity of the wheel. On the other hand, the small r the value, the lower the rigidity of the wheel.

The maximum value Fymax possibly taken by the lateral force Fy is uniquely calculated based on the following equation 3 using the vertical force Fz, the longitudinal force Fx, and the friction coefficient $\mu$.

$$Fy\max = \sqrt{\mu^2 \cdot Fz^2 - Fx^2} \qquad \text{[Equation 3]}$$

Giving consideration to the fact that the cornering power is a ratio, i.e., differential value, of the lateral force Fy that increases with the increase of the slip angle β, this cornering power ka is derivable by the following equation 4.

$$ka = k - \frac{k^2}{2 \cdot Fy\max} \cdot \beta \qquad \text{[Equation 4]}$$

As is understood from the above equations 1 to 4, if the longitudinal force Fx, the lateral force Fy, the vertical force Fz, all of which act on the wheel, and the friction coefficient $\mu$ are all known in advance, the slip angle β of the wheel is uniquely identified. With the slip angle β identified as such, the cornering power ka is calculated based on the correlation between the slip angle β and the lateral force Fx. In view thereof, the values of the longitudinal force Fx, the lateral force Fy, and the vertical force Fz change the value possibly taken by the cornering power Ka. Thus, arbitrarily changing such acting forces controls the cornering power ka. In the present embodiment, the cornering power ka is brought closer to the target cornering power ka.

Figure 3:
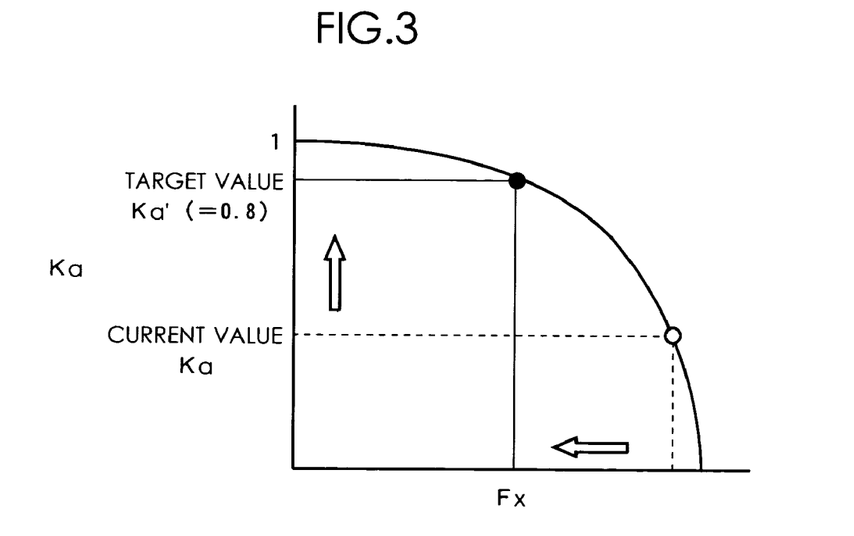
FIG. 3 is an illustrative diagram showing the relationship between a longitudinal force and a cornering power.

In the below, the detailed description will be given for a relationship of the cornering power ka to each of the acting forces. Described first is the relationship between the longitudinal force Fx and the cornering power ka. FIG. 3 is an illustrative diagram showing the relationship between the longitudinal force Fx and the cornering power ka. Such a relationship between the lateral force Fy and the cornering power ka is derived as the following equation 5, as a result of deleting the slip angle β from the equations 1 to 4.

$$ka = k \cdot \sqrt{1 - \frac{Fy}{Fy\max}} \qquad \text{[Equation 5]}$$

Here, if the maximum value Fymax in the equation 5 is substituted by the equation 3, the cornering power ka satisfies an equation 6 below.

$$ka = k \cdot \sqrt{1 - \frac{Fy}{\sqrt{\mu^2 \cdot Fz^2 - Fx^2}}} \qquad \text{[Equation 6]}$$

Assuming that the lateral force Fy and the vertical force Fz are constant from the viewpoint of changing the longitudinal force Fx, it is understood from the equation 6 that the change of the longitudinal force Fx makes the cornering power ka change in value. In this case, the relationship between the longitudinal force Fx and the cornering power ka shown in the equation 6 is roughly expressed by the solid line of FIG. 3. In the drawing, shown is the relationship between the longitudinal force Fx and the cornering power ka with $\mu \cdot Fz=1$, Fy=0.8, and k=1.0.

As an example, referring to FIG. 3, considered now is a case where the current cornering power ka is smaller than the target cornering power ka', e.g., 0.8. In this case, by making the longitudinal force Fx acting on the wheel smaller than the current longitudinal force Fx (in the drawing, decrease in the direction indicated by the arrow), the cornering power ka can be closer to the target cornering power ka'. On the other hand, if the current cornering power ka is larger than the target cornering power ka', the cornering power ka can be closer to the target cornering power ka' by making the longitudinal force Fx acting on the wheel larger than the current longitudinal force Fx. In either cases, when the longitudinal force Fx corresponding to the target cornering power ka' coincides with the longitudinal force Fx acting on the wheel, it means that the cornering power ka coincides with the target cornering power ka'.

Figure 4:
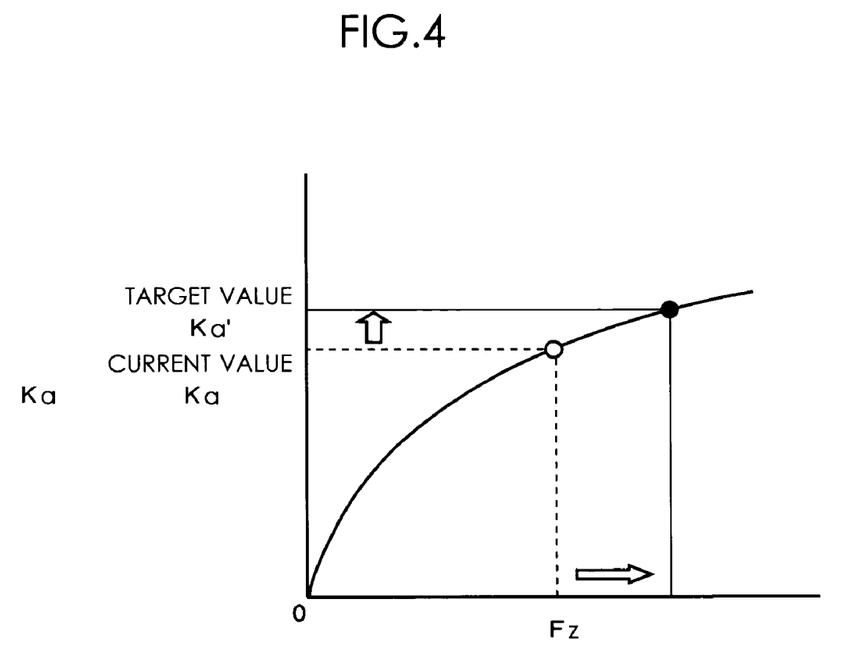
FIG. 4 is an illustrative diagram showing the relationship between a vertical force and the cornering power.

Described next is the relationship between the vertical force Fz and the cornering power ka. FIG. 4 is an illustrative diagram showing the relationship between the vertical force Fz and the corn ring power ka. Refer now to the above equation 6 again. Assuming that the longitudinal force Fx and the lateral force Fy are constant from the viewpoint of changing the vertical force Fz, it is understood that the change of the vertical force Fz makes the cornering power ka change in value. At this time, the relationship between the vertical force Fz and the cornering power ka shown in the equation 6 is roughly expressed by the solid line of FIG. 4. In the drawing, shown is the relationship between the vertical force Fz and the cornering power ka with $\mu=1$, Fy=0.8, Fx=0, and k=1.0.

As an example, referring to FIG. 4, considered now is a case where the current cornering power ka is smaller than the target cornering power. In this case, by making the vertical force Fz acting on the wheel larger than the current vertical force Fz (in the drawing, increase in the direction indicated by the arrow), the cornering power ka of the wheel can be closer to the target cornering power ka'. On the other hand, if the current cornering power ka is larger than the target cornering power ka', the cornering power ka can be closer to the target cornering power ka' by making the vertical force Fz acting on the wheel smaller than the current vertical force Fz. In either cases, when the longitudinal force Fx corresponding to the target cornering power ka' coincides with the longitudinal force Fx acting on the wheel, it means that the cornering power ka coincides with the target cornering power ka'.

Figure 5:
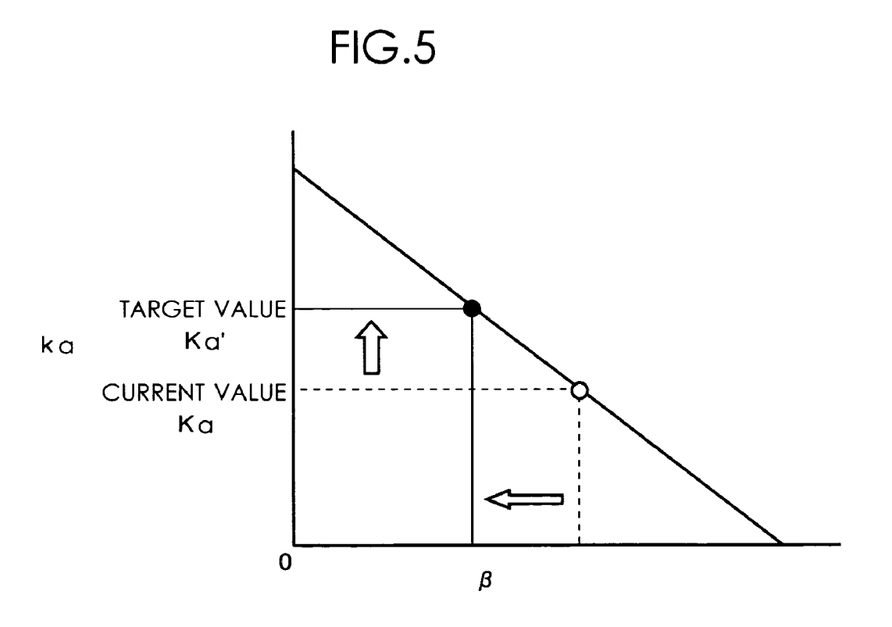
FIG. 5 is an illustrative diagram showing the relationship between a slip angle and the cornering power.

Described next is the relationship between the lateral force Fy and the cornering power ka. Note that, in the present embodiment, the lateral force Fy is not changed directly but equivalently through the change of the slip angle β. FIG. 5 is an illustrative diagram showing the relationship between the slip angle β and the cornering power ka. Refer now to the above equation 4 again. Assuming that the maximum value Fymax possibly taken by the lateral force Fy is invariant (constant) from the viewpoint of changing the slip angle β, it is understood that the change of the slip angle β makes the cornering power ka change in value. At this time, the relationship between the slip angle β and the cornering power ka shown in the equation 4 is roughly expressed by the solid line of FIG. 5.

As an example, referring to FIG. 5, considered now is a case where the current cornering power ka is smaller than the target cornering power ka'. In this case, by making the slip angle β of the wheel smaller than the current slip angle β (in the drawing, decrease in the direction indicated by the arrow), the cornering power ka can be closer to the target cornering power ka'. On the other hand, if the current cornering power ka is larger than the target cornering power ka', the cornering power ka of the wheel can be closer to the target cornering power ka' by making the slip angle β of the wheel larger than the current slip angle β. In either cases, when the slip angle β corresponding to the target cornering power ka' coincides with the slip angle β of the wheel, the cornering power ka coincides with the target cornering power ka'.

Herein, the constants used in the descriptions made referring to FIGS. 3 to 5 are exemplary values. Any other value will lead to almost the same relationship between the longitudinal force Fx and the cornering power ka (or the relationship between the vertical force Fz and the cornering power ka, or the relationship between the slip angle β and the cornering power ka).

In the above, the cornering power ka is to be brought closer to the target cornering power ka' on a wheel basis. Alternatively, considering the kinetic state of the vehicle, the cornering power ka for each of the wheels may be comprehensively controlled. As a general estimation value showing the vehicle steering property, there is a stability factor. The stability factor is used as an index of the vehicle behavior, i.e., stability, at the time of cornering. When the stability factor is positive in value, the vehicle tends to understeer, and with the negative value, the vehicle tends to oversteer. Although every vehicle has its own optimal value for the stability factor, the vehicle may so drive as to always follow its own optimal value to appropriately retain the kinetic state of the vehicle. The stability factor A is calculated by the following equation 7.

$$A = -\frac{m}{2(lf+lr)^2} \cdot \frac{lf \cdot \text{ka\_fave} - lr \cdot \text{ka\_rave}}{\text{ka\_fave} \cdot \text{ka\_rave}} \qquad \text{[Equation 7]}$$

In the equation 7, a reference character m denotes a mass of the vehicle, a reference character lf denotes a distance between a front axle and a barycenter of the vehicle, and a reference character lr denotes a distance between a rear axle and the barycenter of the vehicle. The cornering power of the left front wheel is denoted as ka_fl, the cornering power of the right front wheel is denoted as ka_fr, and ka_fave denotes an average value of these cornering powers ka_fl and ka_fr. Similarly, the cornering power of the left rear wheel is denoted as ka_rl, the cornering power of the right rear wheel is denoted as ka_rr, and ka_rave denotes an average value of these cornering powers ka_rl and ka_rr.

In accordance with the equation 7, the current stability factor Aa of the vehicle is calculated from the current cornering powers ka of each of the wheels. Similarly, in accordance with the equation 7, the target stability factor Aa' of the vehicle is calculated from the target cornering powers ka' of each of the wheels. Here, as shown in the following equation 8, considered now is a differential value ΔA between the stability factor Aa and the target stability factor Aa'.

$$\Delta A = Aa - Aa' \quad \text{[Equation 8]}$$
$$= -\frac{m}{2(lf + lr)^2} \cdot \left\{ lf \cdot \left( \frac{\text{ka\_fave}}{\text{ka\_rave}} - \frac{ka'\_\text{fave}}{ka'\_\text{rave}} \right) - lr \cdot \left( \frac{\text{ka\_rave}}{\text{ka\_fave}} - \frac{ka'\_\text{rave}}{ka'\_\text{fave}} \right) \right\}$$

In the equation 8, ka'__fave denotes an average value of the target cornering powers ka'__fl and ka'__fr of the right and left front wheels, and the ka'__rave denotes an average value of the target cornering powers ka'__rl and ka'__rr of the right and left rear wheels.

This indicates that, to bring the current stability factor Aa of the vehicle closer to the target stability factor Aa', the cornering power ka may be controlled in such a manner that the differential value ΔA is brought closer to 0. To realize ΔA=0, establishing the following equation 9 will do between ka_fave and ka_rave being the average values of the cornering powers ka of the front and rear wheels, and ka'__fave and ka'__rave being the average values of the target cornering powers of the front and rear wheels.

$$\frac{lf}{\text{ka\_rave}} - \frac{lr}{\text{ka\_fave}} = \frac{lf}{ka'\_\text{rave}} - \frac{lr}{ka'\_\text{fave}} \quad \text{[Equation 9]}$$

Herein, expediently, the left side of the equation 9 is referred to as cornering power operation value kar, and the right side thereof as target cornering power operation value ka'r. As is understood from the equation 9, by changing the cornering power operation value kar to equalize with the target cornering power operation value ka'r, the kinetic state (target stability factor) with a desired stability considered can be achieved. For example, if the cornering power operation value kar is larger than the target cornering power operation value ka'r, the cornering power operation value kar is made smaller. In this case, to make the cornering power operation value kar smaller, the cornering power ka of the front wheel may be made relatively smaller, or the cornering power ka of the rear wheel may be made relatively larger. Such a control over the cornering power ka of the front or rear wheel can be realized by changing the action forces on the wheel. This change is made based on the correlation between the action forces acting on the wheels and the cornering power ka, as already described. In other words, changing the action forces in such a manner as to bring the current stability factor Aa of the vehicle closer to the target stability factor Aa' will appropriately keep the kinetic state of the vehicle. Here, bringing the current stability factor Aa closer to the target stability factor Aa' is considered equivalent to bring the operation values Kar of the cornering powers of the front and rear wheels closer to the operation valulues Ka'r of the target cornering powers of the front and rear wheels.

On the basis of such a concept of the cornering power control, referring to FIG. 1 again, described is the cornering power control device 1 of the present embodiment. The cornering power control being one of the characteristics of the present embodiment is carried out in a cornering power control unit (hereinafter, referred to simply as "CP control unit"), which will be described later. As a precondition for such a control, input to the CP control unit are an action force acting on the wheels provided from a detection section 10 (hereinafter, sometimes referred simply to as "wheel action force"), and a friction coefficient μ between the wheels and the road surface provided from an identification section 20. In the present embodiment, the detection section 10 and the identification section 20 output such information are provided to each of the wheels. Accordingly, the CP control unit receives such information for each of the wheels. In FIG. 1, although the detection section 10 and the identification section 20 are each shown expediently as a single block, these block each comprehensively denote the constituents provided for each of the wheels.

The detection section 10 is structured by at least one or more of stress detection sensors (e.g., strain gauges) attached to the axle coupled to the corresponding wheel, and a signal processing circuit for processing a detection signal coming from the stress detection sensor. Based on the known idea that the stress developed to the wheel due to the wheel action force is proportional to the wheel action force, the detection section 10 detects the wheel action force through stress. In the present embodiment, the detection section 10 detects, as the wheel action forces, the lateral force Fy, the longitudinal force Fx, and the vertical force Fz. Here, for the detailed structure of the detection section 10, refer to JP-A-4-331336, if needed.

The identification section 20 identifies the friction coefficient μ by detecting or estimating the friction coefficient μ between the corresponding wheel and the road surface. As one technique for detecting the friction coefficient μ the information provided from the detection section 10 is used to detect as a ratio between the road surface friction (longitudinal force Fx) and the vertical force Fz, i.e., vertical drag. If the identification section 20 calculates the friction coefficient μ based on its own detection result, the detection section 10 functions also as the identification section 20. There are any other various techniques for estimating the friction coefficient μ. As one example, there is a technique for, as disclosed in JP-A-8-2274, making an estimation based on a vehicle yaw rate, a rudder angle, lateral acceleration, and a vehicle speed.

A microcomputer 30 being a CP control unit is structured by a CPU, ROM, RAM, an input/output interface, and the like. In the functional sense, included are a calculation section 31, a determination section 32, and a processing section 33. The calculation section 31 calculates the cornering power ka using the detected longitudinal force Fx, lateral force Fy, and vertical force Fz, and the identified friction coefficient μ. This calculation is made based on the correlation between the slip angle β of the wheel and the lateral force Fy. As described above, in the present embodiment, used are the wheel action force and the friction coefficient μ of each of the four wheels. Thus, the cornering power ka is calculated for each of the wheels, and the resulting cornering powers ka are all forwarded to the determination section 32. The determination section 32 determines whether thus received cornering powers ka are each corresponding to the target cornering power ka' or not through comparison therebetween. If determined that the current cornering power ka is not corresponding to the target cornering power ka', the determination section 32 outputs a cornering power control request signal (hereinafter, simply referred to as "CP control request signal Sr") to the processing section 33. In synchronization with the CP control request signal Sr being output, the current cornering power ka and the target cornering power ka' are output. In response to the CP control request signal Sr, the processing section 33 determines a change amount (step value in the present embodiment) for changing the action forces acting on the corresponding wheel based on the cornering power ka and the target cornering power ka'. Here, to change the action forces, the processing section 33 may determine the change amount in such a manner as to change at least one of the longitudinal force Fx, the lateral force Fy, and the vertical force Fz. Then, thus determined change amount is output to the control section 40 in the subsequent stage.

Depending on the output from the microcomputer 30, i.e., the change amount, the control section 40 controls the action forces acting on the wheels via an actuator 50. In the present embodiment, the control section 40 includes controllers 41 to 45 for controlling actuators 51 to 55 varying in type. The torque distribution controller 41 controls the torque to be transferred to the wheels on a wheel basis through control over a center clutch provided to a center differential (not shown) (or a rear clutch provided to a rear differential, or a front clutch provided to a front differential). Thereby, the longitudinal force Fx acting on the wheels shows a change by the change amount. The brake controller 42 controls, on a wheel basis, the braking force on the wheels through control over the braking system 52 in the subsequent stage, e.g., antilock braking system. Thereby, the longitudinal force Fx acting on the wheels shows a change by the change amount. The engine controller 43 controls an engine output through control over the engine 53 in the subsequent stage. Thereby, the longitudinal force Fx acting on the wheels shows a change by the change amount. The steering controller 44 changes the slip angle β on a wheel basis through control over the steering system 54, e. g, 4WS system or steer-by-wire system, in the subsequent stage. Thereby, the slip angle β of the wheel shows a change by the change amount. Further, the suspension controller 45 controls the vertical load on a wheel basis through control over the suspension system 55, e.g., active suspension system, in the subsequent stage. Thereby, the vertical force Fz acting on the wheels shows a change by the change amount.

Figure 6:
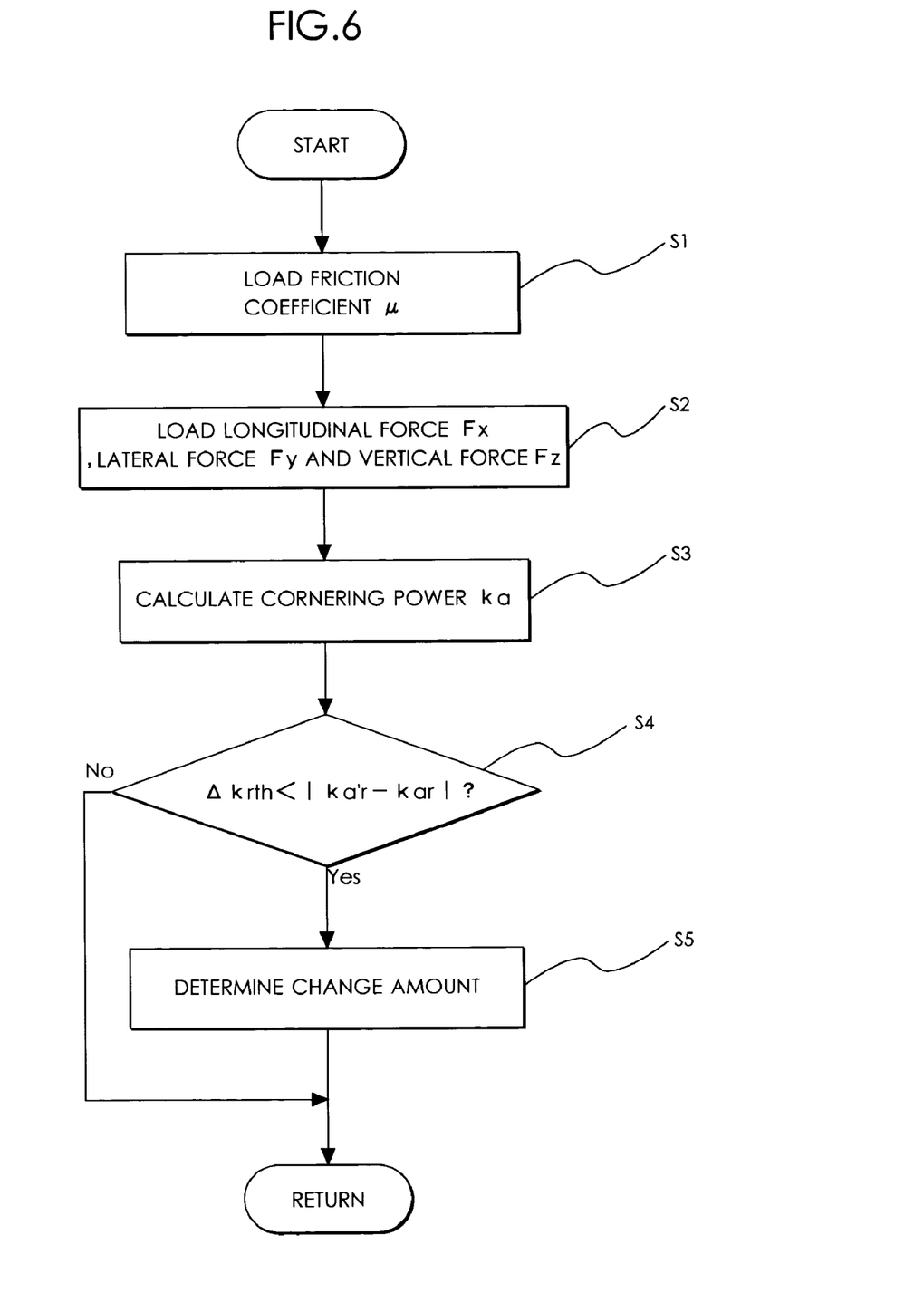
FIG. 6 is a flowchart showing the procedure of cornering power control of the present embodiment.

FIG. 6 is a flowchart showing the procedure of the cornering power control according to the present embodiment. The routine in the flowchart is called at established intervals, and executed by the microcomputer 30. First, in step 1, the calculation section 31 loads the friction coefficient μ from an output signal coming from the identification section 20. In step 2, from a sensor signal coming from the detection section 10, parameters including the longitudinal force Fx, the lateral force Fy, and the vertical force Fz are loaded. Note here that, as described above, if a wheel action force sensor 2 itself is detecting the friction coefficient μ, the procedure skips step 1, and the friction coefficient μ may be further loaded as one of the parameters in step 2.

In step 3, based on thus loaded information, the cornering power ka is calculated. As already described, in a case where the longitudinal force Fx, the lateral force Fy, the vertical force Fz, and the friction coefficient μ are all known, the cornering power ka is uniquely calculated based on the equations 1 to 4.

In step 4, the determination section 32 determines whether or not the cornering power ka is corresponding to the target cornering power ka'. As a precondition for the determination, the cornering power ka and the target cornering power ka' are compared to each other. At the time of such a comparison, the determination section 32 basically compares the cornering powers ka and ka' of the corresponding wheels. Herein, however, based on the concept of the cornering power control using the stability factor, the comparison is performed by using the cornering powers ka of the front and rear wheels, and an operation value calculated by the distance between the front axle (or the rear axle) and a center of gravity of the vehicle.

Specifically, based on the cornering power ka_fl of the left front wheel and the cornering power ka_fr of the right front wheel, the determination section 32 calculates the cornering power ka_fave of the front wheels as an average value of the cornering powers ka_fl and ka_fr. Then, based on the cornering power ka_rl of the left rear wheel and the cornering power ka_rr of the right rear wheel, calculated is the cornering power ka_rave of the rear wheels as an average value of the cornering powers ka_rl and ka_rr. Thereafter, the cornering power operation value kar (=If/ka_fave−Ir/ka_rave), as an operation value based on the cornering power ka_fave of the front wheels and the cornering power ka_rave of the rear wheels, is calculated. Then, it is determined whether or not the cornering power ka is corresponding to the target cornering power ka' by comparing a value (|Ka'r−Kar|), which is an absolute value of the difference between the cornering power operation value Kar and the reference cornering power operation value Ka'r, and the determination value Δkrth.

Here, the target cornering power operation value ka'r is a value predetermined in the vehicle designing phase, for example, considering the vehicle stability. The determination value Δkrth is arbitrarily determined from the range available for the differential value of a degree that the cornering power operation value kar and the target cornering power operation value ka'r are substantially equal, that is, a degree requiring no control for the cornering power ka.

Therefore, if determined as Δkrth≧|ka'r−kar|, i.e., if determined as No, the determination section 32 determines that the cornering power ka is not yet to be controlled. Then, the procedure exits from the routine. On the other hand, if determined as Δkrth<|ka'r−kar|, i.e., if determined as Yes, the determination section 32 determines that the cornering power ka is to be controlled, and outputs the CP control request signal Sr to the processing section 33. Then, the procedure goes to step 5.

In step 5, the processing section 33 determines the change amount (step value) which changes at least one action force out of the longitudinal force Fx, the lateral force Fy, and the vertical force Fz, all acting on the wheels. As a precondition for determining the step value, the cornering power operation value kar and the target cornering power operation value ka'r are compared to each other for their values. If the comparison indicates that the cornering power operation value kar is larger than the target cornering power operation value ka'r, the processing section 33 determines that any of the following processes should be executed to bring the cornering power operation value kar closer to the target cornering power operation value ka'r.

1. Make relatively smaller the cornering power ka_fave of the front wheels
2. Make relatively larger the cornering power ka_rave of the rear wheels
3. Perform both 1 and 2

If determined that the current cornering power operation value kar is smaller than the target cornering power operation value ka'r, the processing section 33 determines that any of the following processes should be executed.

4. Make relatively larger the cornering power ka_fave of the front wheels
5. Make relatively smaller the cornering power ka_rave of the rear wheels
6. Perform both 4 and 5

The processing section 33 determines the step value through any of the following patterns, or any combination thereof.

i. Make the longitudinal force Fx acting on the front wheels larger than the current longitudinal force Fx
ii. Make the vertical force Fz acting on the front wheels smaller than the current vertical force Fz
iii. Make the slip angle β of the front wheels larger than the current slip angle β

To realize Process 2, the processing section 33 determines the step value through any of the following patterns, or any combination thereof.

iv. Make the longitudinal force Fx acting on the rear wheels smaller than the current longitudinal force Fx
v. Make the vertical force Fz acting on the rear wheels larger than the current vertical force Fz
vi. Make the slip angle β of the rear wheels smaller than the current slip angle β

Furthermore, to realize Process 3, the processing section 33 determines the step value through any combination of Patterns i to iii, and iv to vi.

To realize Process 4, the processing section 33 determines the step value through any of the following patterns, or any combination thereof.

vii Make the longitudinal force Fx acting on the front wheels smaller than the current longitudinal force Fx
viii Make the vertical force Fz acting on the front wheels larger than the current vertical force Fz
ix Make the slip angle β of the front wheels smaller than the current slip angle β.

To realize Process 5, the processing section 33 determines the step value through any of the following patterns, or any combination thereof.

x Make the longitudinal force Fx acting on the rear wheels larger than the current longitudinal force Fx
xi Make the vertical force Fz acting on the rear wheels smaller than the current vertical force Fz
xii Make the slip angle β of the rear wheels larger than the current slip angle β.

Furthermore, to realize Process 6, the processing section 33 determines the step value through any combination of Patterns vii to ix, and x to xii.

Based on the comparison result, with the assumption that any of Processes 1 to 3, or 4 to 6 is to be executed, the processing section 33 outputs a predetermined step value (control value) δ to the control section 40 based on Patterns i to xii. Then, the procedure exits the routine.

In the below, described in detail is the operation of the control section 40 after receiving the step value δ from the microcomputer 30. Here, basically, the cornering powers ka of the right and left wheels are considered almost equal, and a description is made about the front and rear wheels.

(Control Over Longitudinal Force Fx)

Here, assuming that the microcomputer 30 outputs a step value δFx equivalent to the longitudinal force Fx. In this case, the step value δFx equivalent to the longitudinal force Fx is forwarded to the torque distribution controller 41, which is structured by an input torque estimation section 41a, a torque distribution ratio calculation section 41b, and a differential limit torque calculation section 41c. To the input torque estimation section 41a, forwarded are vehicle state signals (the number of engine rotation Ne, the degree of throttle opening θacc) provided from sensors 60 and 61, and a gear position signal P indicating the transmission gear position at this point of time derived from a sensor 63. Based on thus forwarded information, the input torque estimation section 41a estimates an engine output from the number of engine rotation Ne and the degree of throttle opening θacc. By multiplying the engine output by the gear ratio equivalent to the gear position P, an input torque Ti of the center differential is calculated. The torque distribution ratio calculation section 41b calculates a longitudinal torque distribution ratio α based on the step value δFx and the input torque Ti. For example, if the step value δFx is increasing the longitudinal force Fx of the front wheels, or if decreasing the longitudinal force Fx of the rear wheels, the torque distribution ratio α is so determined that the forces acting on the front wheels is larger. On the other hand, if the step value δFx is decreasing the longitudinal force Fx of the front wheels, or if increasing the longitudinal force Fx of the rear wheels, the torque distribution ratio α is so determined that the forces acting on the rear wheels is larger. Then, based on the longitudinal torque distribution ratio α and the input torque Ti, the differential limit torque calculation section 41c calculates a center differential limit torque. At the same time, based on the center differential limit torque, the torque distribution of the center clutch 51 is controlled to be variable. Then, the center clutch 51 is activated, and the torque distribution ratio α is so set that the forces acting on the front wheels is larger (or the rear wheels is larger), so that the longitudinal force Fx is changed by the step value δFx, and thus cornering power ka is brought closer to the target cornering power ka'.

Further, for example, to control the torque distribution of the rear right and rear left wheels, similarly to the torque distribution of the front and rear wheels, the torque distribution of the rear clutch may be controlled to be variable based on the rear differential limit torque in the rear clutch provided to the rear differential. To control the torque distribution of the front right and front left wheels, the torque distribution of the front clutch may be controlled to be variable based on the front differential limit torque in the front clutch provided to the front differential. For the detailed technique of controlling the torque distribution of the vehicle, refer to JP-A-8-2274, if needed.

Herein, the torque distribution controller 41 is the one, basically, controlling the longitudinal force Fx by controlling the driving force. Alternatively, the longitudinal force Fx may be controlled through control over the braking force. The control over the braking force is applied by the braking controller 42. To be specific, the braking controller 42 has information, i.e., torque distribution ratio α, provided from the torque distribution ratio calculation section 41b. After receiving the information, the braking controller 42 controls the longitudinal force Fx (braking force) acting on the wheels based on the torque distribution ratio α. For example, when the torque distribution ratio α shows front-wheel-higher tendency, the braking force distribution ratio is so determined as to show rear-wheel-higher tendency compared to the current braking force distribution ratio. On the other hand, if the torque distribution ratio α shows rear-wheel-higher tendency, the braking force distribution ratio is so determined as to show front-wheel-higher tendency compared to the current braking force distribution ratio. In this manner, the braking force distribution ratio is fed back to the braking system 52, and produces the similar effects as the center clutch 52.

The engine controller 43 can relatively increase/decrease the longitudinal force Fx acting on the wheels by controlling the output of the engine 53. As an example, the engine controller 43 so controls the engine 53 that the engine output is increased, whereby the longitudinal force Fx on the wheels is relatively increased. On the other hand, the engine controller 43 so controls the engine 53 that the engine output is decreased, whereby the longitudinal force Fx acting on the wheels is relatively decreased. Accordingly, through cooperation between the engine controller 43 and the torque distribution controller 41 (or braking controller 42), the longitudinal force Fx is to be controllable more effectively. For example, the engine controller 43 can apply such controls based on the current engine output and the torque distribution ratio $\alpha$.

(Control Over Vertical Force Fz)

Here, assuming that the microcomputer 30 outputs a step value $\delta$Fz equivalent to the vertical force Fz. In this case, the step value $\delta$Fz equivalent to the vertical force Fz is input into the suspension controller 45. In response to the input, the suspension controller 45 controls the load on the wheels based on the step value $\delta$Fz. For example, when the step value $\delta$Fz is increasing the vertical force Fz acting on the front wheels, or decreasing the vertical force Fz acting on the rear wheels, the control amount equivalent to the step value $\delta$Fz is determined and output in such a manner that the current weighted valance of the vehicle shows relatively front-wheel-higher tendency. On the other hand, when the step value $\delta$Fz is decreasing the vertical force Fz acting on the front wheels, or increasing the vertical force Fz acting on the rear wheels, the control amount equivalent to the step value $\delta$Fz is determined and output in such a manner that the current weighted valance of the vehicle shows relatively rear-wheel-higher tendency. As a result, thus determined control amount is fed back to the suspension system 55, and then realized is the weighted balance with front-wheel-higher or rear-wheel-higher tendency. This changes the action force equivalent to the step value $\delta$Fz, and thus the cornering power ka is brought closer to the target cornering power ka'. As to the right and left wheels, the vertical force Fz can be controlled in a similar manner. For such a load control technique acting on the wheels in detail, refer to JP-A-62-275814, if needed.

(Control Over Slip Angle $\beta$)

Here, assuming that the microcomputer 30 outputs the step value $\delta\beta$ equivalent to the slip angle $\beta$. In this case, the step value $\delta\beta$ equivalent to the slip angle $\beta$ is input into the steering controller 44. In response to the input, the steering controller 44 controls the slip angle $\beta$ of the wheels via the steering system 44 based on the step value $\delta\beta$. For example, when the step value $\delta\beta$ is increasing the slip angle $\beta$ of the front wheels (or increasing the slip angle $\beta$ of the rear wheels), the control amount equivalent to the step value $\delta\beta$ is determined and output in such a manner that the current slip angle $\beta$ of the front wheels is increased more, or of the rear wheels. On the other hand, when the step value $\delta\beta$ is decreasing the slip angle $\beta$ of the front wheels or decreasing the slip angle $\beta$ of the rear wheels, the current slip angle $\beta$ of the front wheels is decreased. Alternatively, the control amount is determined and output in such a manner that the slip angle $\beta$ of the rear wheels is decreased. In this manner, based on the output control amount, the suspension system 55 is fed back for control, and is changed to be a slip angle equivalent to the step value $\delta\beta$. Thus, the cornering power ka' is brought closer to the target cornering power ka. As to the right and left wheels, the slip angle $\beta$ can be controlled in a similar manner. To controlling the slip angle $\beta$ of the wheels in the above manner can be realized in a four-wheels steering system or a steer-by-wire system. For these systems, refer to JP-A-11-91607 or JP-A-2000-128002, if needed.

As such, according to the present embodiment, the cornering power ka is calculated based on the detected longitudinal force Fx, lateral force Fy, and vertical force Fz, and the identified friction coefficient $\mu$. The cornering power ka is calculated based on the correlation between the slip angle $\beta$ of the wheels and the lateral force Fy. In this embodiment, however, the action forces acting on the wheels are directly detected, whereby the correlation between the slip angle $\beta$ and the lateral force Fy can be correctly grasped for ready comparison. This allows the cornering power ka in the non-linear region to be calculated more correctly than conventional, which could only be estimated. As a result, for example, even with the driving condition such as limited cornering, thus calculated cornering power ka contributes to improve the reliability as a value.

Further, after calculation of the current cornering power ka, based on the resulting cornering power ka and the target cornering power ka', the change amount for changing the wheel action forces is determined for output to the control section 40. In response, the control section 40 controls the actuator 50, changing the action forces. Due to this change of the action forces, the cornering power ka is changed, and resultantly the cornering power ka is brought closer to the target cornering powerka'. Accordingly, the kinetic state exceeding the limited wheel capability, e.g., such a state that the cornering power ka is considerably reduced in value, can be suppressed, whereby the vehicle steerbility and stability is successfully improving. Moreover, in the present embodiment, by controlling the cornering power ka in consideration of the vehicle stability, improving the steerbility and stability to a greater degree.

The target cornering power ka' described in the above can be determined based on the reference cornering power k. For example, the target cornering power ka' can be determined as a value c times larger than the coefficient of the reference cornering power k. This value of c is arbitrarily selectable in a range of 0<c<1. It is preferable to be determined for every vehicle in such a manner as to be minimum of the cornering power required for securing the vehicle controllability. This makes the control power ka to be so controlled as to at least secure the vehicle controllability, successfully improving the steerbility and stability.

Note here that, in the above embodiment, described is the technique for controlling the cornering power ka in consideration of the stability. Alternatively, another technique will do for bringing closer the cornering power ka to the target cornering power ka' focusing on the wheel itself. With such a technique, similar effects as the above can be achieved.

Figure 7:
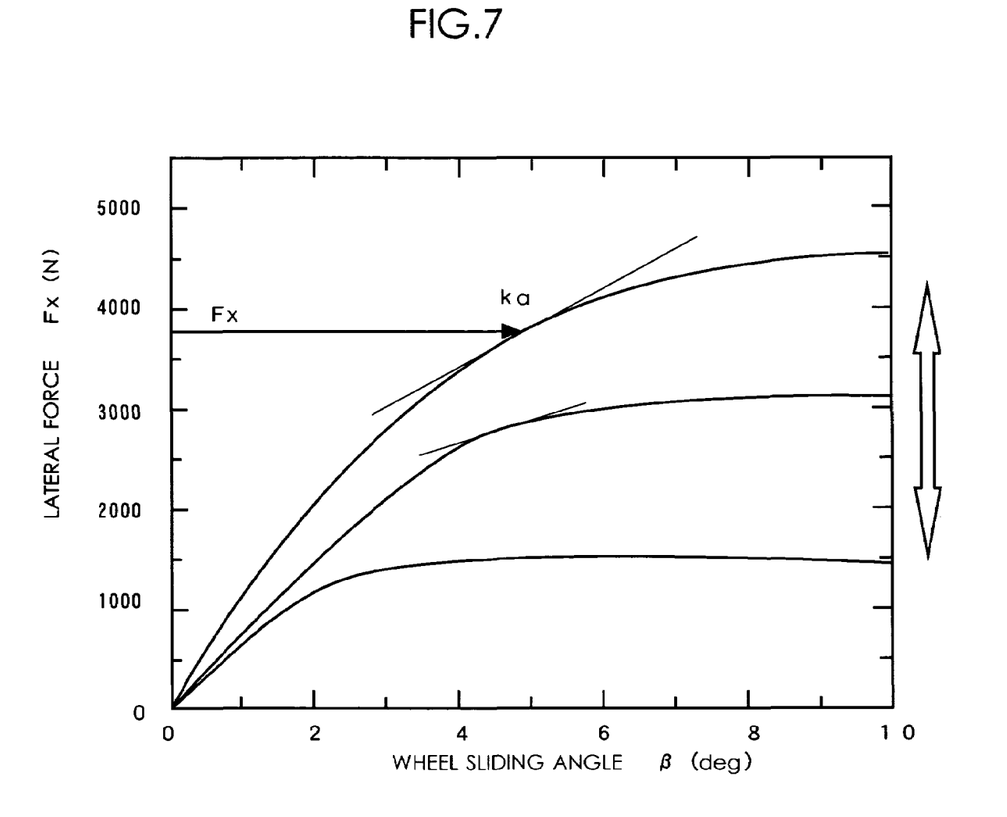
FIG. 7 is an illustrative diagram showing an exemplary tire model including the slip angle and the lateral force of the wheels empirically calculated.

Further, in the present embodiment, the correlation between the slip angle $\beta$ of the wheels and the lateral force Fy is defined using the tire model to which quadratic approximation is applied. The present invention is not surely restrictive thereto. For example, the correlation between the slip angle $\beta$ and the lateral force Fy can be defined using the tire property including the slip angle $\beta$ and the lateral force Fy empirically derived under various conditions (longitudinal force Fx, vertical force Fz, and friction coefficient $\mu$), or using another numerical model, e.g., Fiala model. FIG. 7 is an illustrative diagram showing an exemplary tire model including the slip angle $\beta$ and the lateral force Fy empirically derived. As is known from the drawing, if the correlation between the slip angle $\beta$ and the lateral force Fy is known in advance, the cornering power is uniquely calculated as a ratio, i.e., a differential value, of the lateral force Fy increasing with the increase of the slip angle $\beta$.

In the above embodiment, the cornering power ka is defined as the equation 4. However, it is also calculated as an equation 10 in a simpler manner.

$$kp = \frac{Fy}{\beta} = k - \frac{k^2}{4 \cdot Fy\max} \cdot \beta \qquad \text{[Equation 10]}$$

Here, for distinguishing from the cornering power ka, another cornering power kp shown in the equation is referred to as pseudo cornering power. With such an equation, the pseudo cornering power kp basically shows the same tendency as the cornering power ka shown in the equation 4. Thus, using this pseudo cornering power kp can achieve the similar effects as the above embodiment.

Further, in the above embodiment, the action forces by the change are output as a step value, and the wheel action forces are controlled equivalently to the step value. However, the processing section 33 may so calculate the change amount that the current cornering power ka is brought closer to the target cornering power ka'. This calculation is made based on the relationship between each of the action forces and the cornering power ka shown in FIGS. 3 to 5.

Still further, in the above embodiment, described is the technique for controlling the cornering power ka for every wheel assuming that the vehicle is a four-wheel-drive. Alternatively, it is possible to carry out the cornering power control only to the driving wheel of the front-wheel-drive (or rear-wheel-drive) vehicle. Here, considering vehicle steerbility and stability, it is preferable to perform the cornering power control to each of the wheels provided to the vehicle. On the other hand, in view of the cornering power control, control applied to a part of the wheels contributes to improvement of the vehicle steerbility and stability. Similarly, in view of vehicle control new as cornering power control, the action forces acting on the wheels do not make the technique inapplicable for detecting from the lateral acceleration working on the vehicle, for example, in an indirect manner.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

Additionally, the disclosure of Japanese Patent Application No. 2003-205929 filed on Aug. 5, 2003 including the specification, drawing and abstract is incorporated herein by reference in its entirety.

What is claimed is:

1. A cornering power control device for controlling a cornering power of a wheel, comprising:
   a detection section for detecting a longitudinal force, a lateral force, and a vertical force each as an action force exerted on said wheel;
   an identification section for identifying a friction coefficient between said wheel and a road surface;
   a calculation section for calculating said cornering power of said wheel based on a correlation between a slip angle and said lateral force for said wheel, by using said detected longitudinal force, said detected lateral force, said detected vertical force, and said identified friction coefficient;
   a processing section for determining a change amount for changing at least one of said action forces including said longitudinal force, said lateral force, and said vertical force each acting on said wheel, based on said calculated cornering power and a target cornering power required for said wheel; and
   a control section for controlling at least one of said action forces including said longitudinal force, said lateral force, and said vertical force all each acting on said wheel, based on said change amount determined by said processing section.

2. The cornering power control device according to claim 1, wherein said detection section comprises:
   at least one stress detection sensor attached to an axle of said wheel; and
   a signal processing circuit for processing a detection signal outputted from said stress detection sensor, wherein said stress detection sensor detects stress occurring to said axle.

3. The cornering power control device according to claim 1, wherein
   said calculation section calculates said cornering power in a non-linear region.

4. The cornering power control device according to claim 1, wherein
   said correlation between said slip angle and said lateral force for said wheel is determined based on a tire model defining a dynamic property of said wheel.

5. The cornering power control device according to claim 1, wherein
   when said calculated cornering power is smaller than said target cornering power, said processing section determines said change amount in such a manner that said longitudinal force acting on said wheel becomes smaller than said detected longitudinal force, and when said calculated cornering power is larger than said target cornering power, said processing section determines said change amount in such a manner that said longitudinal force acting on said wheel becomes larger than said detected longitudinal force.

6. The cornering power control device according to claim 1, wherein
   when said calculated cornering power is smaller than said target cornering power, said processing section determines said change amount in such a manner that said vertical force acting on said wheel becomes larger than said detected vertical force, and when said calculated cornering power is larger than said target cornering power, said processing section determines said change amount in such a manner that said vertical force acting on said wheel becomes smaller than said detected vertical force.

7. The cornering power control device according to claim 1, wherein
   when said calculated cornering power is smaller than said target cornering power, as said change amount corresponding to said lateral force, said processing section determines said change amount in such a manner that said slip angle of said wheel becomes smaller than a current value of said current slip angle, and when said calculated cornering power is larger than said target cornering power, as said change amount corresponding to said lateral force, said processing section determines said change amount in such a manner that said slip angle of said wheel becomes larger than a current value of said slip angle.

8. The cornering power control device according to claim 1, wherein
said target cornering power is determined based on a reference cornering power.

9. The cornering power control device according to claim 1, wherein
said calculation section calculates said cornering power for all of said wheels provided to a vehicle.

10. The cornering power control device according to claim 9, wherein
said processing section determines said change amount in such a manner that a stability factor of said vehicle which is calculated based on said calculated cornering power is brought closer to a target stability factor of said vehicle which is calculated based on said target cornering power.

11. The cornering power control device according to claim 10, wherein
said processing section determines said change amount in such a manner that an operation value of said calculated cornering powers for front and rear wheels is brought closer to that of said target cornering powers for said front and rear wheels.

12. The cornering power control device according to claim 1, further comprising:
a determination section for determining whether said cornering power corresponds to a target cornering power.

13. The cornering power control device according to claim 12, wherein when said cornering power does not correspond to said target cornering power, said determination section outputs a cornering power control request signal to said processing section.

14. The cornering power control device according to claim 1, further comprising:
a torque distribution controller, comprising:
an input torque estimation section which calculates an input torque;
a torque distribution ratio distribution section which calculates a longitudinal torque distribution ratio based on said input torque; and
a differential limit torque calculation section which calculates a center differential limit torque.

15. A cornering power control method for controlling a cornering power of a wheel, comprising:
detecting a longitudinal force, a lateral force, and a vertical force each as an action force exerted on said wheel;
identifying a friction coefficient between said wheel and a road surface;
calculating said cornering power based on a correlation between a slip angle and said lateral force of said wheel, by using said detected longitudinal force, said detected lateral force, said detected vertical force, and said identified friction coefficient;
determining a change amount for changing at least one of said action forces including said longitudinal force, said lateral force, and said vertical force each acting on the wheels, based on said calculated cornering power and a target cornering power required for said wheel; and
controlling at least one of said action forces including said longitudinal force, said lateral force, and said vertical force each acting on said wheel, based on said determined change amount.

16. The cornering power control method according to claim 15, wherein
during said determining, when said calculated cornering power is smaller than said target cornering power, said change amount is so determined that said longitudinal force acting on said wheel becomes smaller than said detected longitudinal force, and when said calculated cornering power is larger than said target cornering power, said change amount is so determined that said longitudinal force acting on said wheel becomes larger than said detected longitudinal force.

17. The cornering power control method according to claim 15, wherein
during said determining, when said calculated cornering power is smaller than said target cornering power, said change amount is so determined that said vertical force acting on said wheel becomes larger than said detected vertical force, and when said calculated cornering power is larger than said target cornering power, said change amount is so determined that said vertical force acting on said wheel becomes smaller than said detected vertical force.

18. The cornering power control method according to claim 15, wherein
during said determining, when said calculated cornering power is smaller than said target cornering power, as said change amount corresponding to said lateral force, said change amount is so determined that said slip angle of said wheel becomes smaller than a current value of said slip angle, and when said calculated cornering power is larger than said target cornering power, as said change amount corresponding to said lateral force, said change amount is so determined that said slip angle of said wheel becomes larger than said current value of said slip angle.

19. The cornering power control method according to claim 15, wherein
during said calculating, said cornering power is calculated for all of said wheels provided to a vehicle, and
during said determining, said change amount is so determined that operation values of said calculated cornering powers for front and rear wheels are brought closer to that of said target cornering powers for said front and rear wheels.

20. A cornering power control device for controlling a cornering power of a wheel, comprising: means for detecting a longitudinal force, a lateral force, and a vertical force each as an action force exerted on said wheel;
means for identifying a friction coefficient between said wheel and a road surface;
means for calculating said cornering power based on a correlation between a slip angle and said lateral force of said wheel, by using said detected longitudinal force, said detected lateral force, said detected vertical force, and said identified friction coefficient;
means for determining a change amount for changing at least one of said action forces including said longitudinal force, said lateral force, and said vertical force each acting on the wheels, based on said calculated cornering power and a target cornering power required for said wheel; and
means for controlling at least one of said action forces including said longitudinal force, said lateral force, and said vertical force each acting on said wheel, based on said determined change amount.

* * * * *